3,218,233
ANALGESIC COMPOSITIONS
Mozes Juda Lewenstein, 80—49 Park Lane,
Kew Gardens, N.Y.
No Drawing. Filed Jan. 24, 1963, Ser. No. 253,766
The portion of the term of the patent subsequent to
Mar. 5, 1980, has been disclaimed
2 Claims. (Cl. 167—65)

This application is a continuation-in-part of application Serial No. 676,392, filed August 5, 1957, now U.S. Patent No. 3,080,287.

This invention relates to analgesic compositions and it has particular relation to compositions in which analgesic compounds of the type described hereinafter are used in combination with a barbituric acid compound of the type disclosed and under the conditions described hereinafter.

Combinations of analgesics with barbituric acid compounds have been suggested previously. The purpose of such combinations was not only to relieve pain, but also to simultaneously calm down nervous patients by the action of therapeutic doses of the barbituric acid ingredient in the combinations. The use of such doses renders these compositions less suitable for daytime administration to patients who have to attend their work or other activities, since therapeutic doses of most barbiturates tend to induce sleep and make the patients drowsy. Another disadvantage of such compositions is the cumulative effect of repeated therapeutic doses of barbituric acid compounds when the compositions have to be repeatedly administered during a protracted period of time.

The use of mild analgesics, such as aminopyrine or aspirin, in combination with barbiturates has also been suggested, but the results were not encouraging, because it has been found that little additional analgesia was conferred by barbiturates in combination with such mild analgesics, neither were other advantages obtained.

It has now unexpectedly been discovered that improved analgesic effects can be obtained by compositions in which the mild analgesics and the barbituric acid compounds described hereinafter are combined with each other under the conditions of the present invention.

According to the present invention, it has been found that by using a therapeutic dose of (a) aspirin (acetylsalicyclic acid) in combination with (b) phenacetin (acetophenetidine) or p-acetaminophenol, (c) caffeine and (d) with a sub-therapeutic dose of a barbituric acid compound, which is rapid on on-set and short in duration of its effect, compositions are obtained in which the analgesic effect of the active ingredients is accelerated, increased and prolonged in comparison with the added effects of the individual ingredients, as well as in comparison with partial combinations, e.g., (a), (c) and (d) or (b), (c), and (d), and which are practically free from undesired side effects. In other words, this increase and improvement of the effect requires the co-action of the ingredients (a), (b), (c) and (d) and represents a novel and unexpected synergistic effect of these ingredients.

In the use of compositions embodying this invention, drowsiness and hangover and other undesirable side effects ocurring in the use of known compositions are usually not encountered.

*Example I*

A mixture is prepared from the following ingredients:
(a) Aspirin _____ grains__ 3½
(b) Phenacetin _____ do____ 2½
(c) Caffeine _____ do____ ½
(d) Hexobarbital _____ milligrams__ 50

The above ingredients are incorporated in conventional manner in each tablet for oral administration.

*Example II*

Mixtures are prepared from the ingredients named in the above Example I, whereby the individual ingredients are used in the following ranges:

(a) Aspirin _____ grains__ 2–6
(b) Phenacetin _____ do____ 1–4
(c) Caffeine _____ do____ ¼–1
(d) Hexobarbital _____ milligrams_____ 20–60

The resulting mixtures are formed to tablets in conventional manner.

*Example III*

|  | Mgs. |
|---|---|
| Acetylsalicyclic acid | 224.00 |
| Acetophenetidine | 160.00 |
| Caffeine | 30.00 |
| 5-(1-cyclohexenyl)-5-methyl-N-methyl-barbituric acid | 60.00 |

Ingredients used in first granulation:

|  | Mgs. |
|---|---|
| Starch added wet paste | 33.84 |
| Certified yellow #5 Tartrazine, 91% | 0.12 |
| Acacia | 7.50 |
| Sugar | 7.50 |

Ingredients used in second granulation:

|  | Mgs. |
|---|---|
| Starch added wet paste | 38.33 |
| Certified yellow #5 Tartrazine, 91% | 0.10 |
| Stearic acid | 4.99 |
| Talc | 5.99 |
| Starch q.s. | 7.94 |

*Example IV*

In any of the above Examples I–III, an equal part by weight of thioamylal sodium or three times in weight doses of thiopental can be substituted for the hexobarbital. A mixture of these barbiturates can also be used. Furthermore, instead of the respective barbituric acid, a thereapeutically applicable salt thereof, e.g., the sodium salt, can be used, and instead of caffeine an equivalent amount of a therapeutically applicable caffeine salt can be used. Instead of acetophenetidine, an equal amount of p-acetaminophenol can be used.

According to the present invention, the above-named ingredients, i.e., aspirin, phenacetin or p-acetaminophenol, caffeine are used in the usual therapeutic doses, while a barbituric acid compound which is rapid on on-set and short in duration is used in sub-therapeutic doses. In the above-described proportions, due to co-action of these ingredients, a substantially increased synergistic analgesic effect results, which cannot be obtained in the absence of ingredients and proportions called for by the present invention. Thus, for example, the composition according to the above Example I yields a considerably increased analgesic effect in comparison with a similar composition, in which phenacetin is omitted or substituted by aspirin, or in which the aspirin is omitted or substituted by phenacetin, or in which the conditions called for by the present invention are not observed in other respects.

The term "rapid on onset and short in duration" is used in the present application to denote barbituric acid compounds, the therapeutic action of which is analogous to that of the compounds described in the above examples.

The parts mentioned above are parts by weight if not otherwise stated.

What is claimed is:

1. Analgesic compositions containing as active ingredients (a) 130–390 parts of acetylsalicylic acid; (b) 65–260 parts of p-acetaminophenol; (c) 16–65 parts of a compound selected from the group consisting of caffeine and therapeutically applicable salts thereof; and at least one barbituric acid compound selected from the group consisting of hexobarbital, thioamylal, thiopental, and therapeutically acceptable salts thereof, said barbituric acid compounds being rapid on on-set and short in duration, and hexobarbital being used in an amount of 20–60 parts and thioamylal and thiopental being used in amounts equivalent to 20–60 parts of hexobarbital.

2. Analgesic compositions containing as active ingredients (a) aspirin, (b) p-acetaminophenol, (c) caffeine and (d) hexobarbital, in the proportions of (a) 3½ grains (b) 2½ grains (c) ½ grain and (d) 50 milligrams.

References Cited by the Examiner

UNITED STATES PATENTS 3,080,287  3/1963  Lewenstein _____ 167—65

OTHER REFERENCES

Beckman. Pharmacology, The Nature, Action and Use of Drugs, Saunders Co., 1961, page 243.

Goodman: The Pharmacological Basis of Therapeutics, Sec. Ed., Macmillan Co., 1955, p. 125.

Goodman: Pharmacological Basis of Therapeutics, Sec. Ed., 1955, Macmillan Co., page 311.

Wilson. The American Drug Index; Lippincott Co., 1956, p. 7.

JULIAN S. LEVITT, *Primary Examiner.*

FRANK CACCIAPAGLIA, JR., LEWIS GOTTS,
*Examiners.*